(12) United States Patent
Remmelg et al.

(10) Patent No.: US 11,661,216 B2
(45) Date of Patent: May 30, 2023

(54) SEPARATION DEVICE FOR SPACECRAFT AND A METHOD FOR SEPARATION

(71) Applicant: RUAG SPACE AB, Gothenburg (SE)

(72) Inventors: Jörgen Remmelg, Vikingstad (SE);
Örjan Arulf, Linköping (SE); Anders Helmersson, Linköping (SE); Daniel Wramell Kristoffersson, Linköping (SE)

(73) Assignee: RUAG SPACE AB, Gothenburg (SE)

( * ) Notice: Subject to any disclaimer, the term of this patent is extended or adjusted under 35 U.S.C. 154(b) by 617 days.

(21) Appl. No.: 16/642,956

(22) PCT Filed: Feb. 9, 2018

(86) PCT No.: PCT/SE2018/050124
§ 371 (c)(1),
(2) Date: Feb. 28, 2020

(87) PCT Pub. No.: WO2019/045613
PCT Pub. Date: Mar. 7, 2019

(65) Prior Publication Data
US 2020/0346788 A1 Nov. 5, 2020

(30) Foreign Application Priority Data
Sep. 1, 2017 (WO) .................. PCT/SE2017/050874

(51) Int. Cl.
*B64G 1/64* (2006.01)
*F16B 31/00* (2006.01)
(52) U.S. Cl.
CPC ............ *B64G 1/645* (2013.01); *B64G 1/641* (2013.01); *F16B 31/005* (2013.01)

(58) Field of Classification Search
CPC ....... B64G 1/645; B64G 1/641; F16B 31/005; F16B 15/20; F16B 31/043; F16B 31/04; F16B 37/00; F16B 43/00; F42B 3/006
See application file for complete search history.

(56) References Cited

U.S. PATENT DOCUMENTS 3,926,090 A * 12/1975 Bunker ............... F16B 37/0864
411/434
4,002,120 A 1/1977 Swales et al.
(Continued)

FOREIGN PATENT DOCUMENTS

JP 04208700 A 7/1992
JP 07156900 A 6/1995
(Continued)

OTHER PUBLICATIONS

International Search Report and Written Opinion dated May 17, 2018 for PCT/SE2018/050124, 12 pages.
(Continued)

*Primary Examiner* — Medhat Badawi
*Assistant Examiner* — Vicente Rodriguez
(74) *Attorney, Agent, or Firm* — Sage Patent Group

(57) ABSTRACT

The invention relates to a separation device for a spacecraft or launcher. The separation device includes an inner housing divided into at least two portions locked to each other by a locking device in a locking position. The locking device is arranged to move between a locking position and a releasing position. The separation device includes an initiator including means for providing high pressure fluid to an expansion chamber when the separation device is switched from a locked state to a released state. The high pressure fluid in an expansion chamber moves the locking device from the locking position to the releasing position when the separation device is switched from the locked state to the released state. The separation device includes a dampening arrange- (Continued)

ment arranged to attenuate a peak load when the separation device is switched from the locked state to the released state.

19 Claims, 9 Drawing Sheets

(56) References Cited

U.S. PATENT DOCUMENTS

| | | | | |
|---|---|---|---|---|
| 5,695,306 A * | 12/1997 | Nygren, Jr. | ............ | F15B 15/261 411/433 |
| 6,352,397 B1 * | 3/2002 | O'Quinn | ................ | B64G 1/645 411/270 |
| 2001/0025564 A1 * | 10/2001 | Forys | .................... | F15B 15/222 89/1.14 |
| 2013/0101369 A1 * | 4/2013 | Lenoir | .................... | F16B 31/00 411/2 |

FOREIGN PATENT DOCUMENTS

| | | |
|---|---|---|
| JP | 08219134 A | 8/1996 |
| KR | 20140087464 A | 7/2014 |
| WO | 2013125998 A1 | 8/2013 |

OTHER PUBLICATIONS

International Preliminary Report on Patentability dated May 2, 2019 for PCT/SE2018/050124, 15 pages.
International Search Report and Written Opinion dated May 17, 2018 for PCT/SE2017/050874, 11 pages.
International Preliminary Report on Patentability dated Mar. 26, 2019 for PCT/SE2017/050874, 9 pages.
Extended European Search Report dated Apr. 28, 2021 for European Patent Application No. 18852193.4, 7 pages.

* cited by examiner

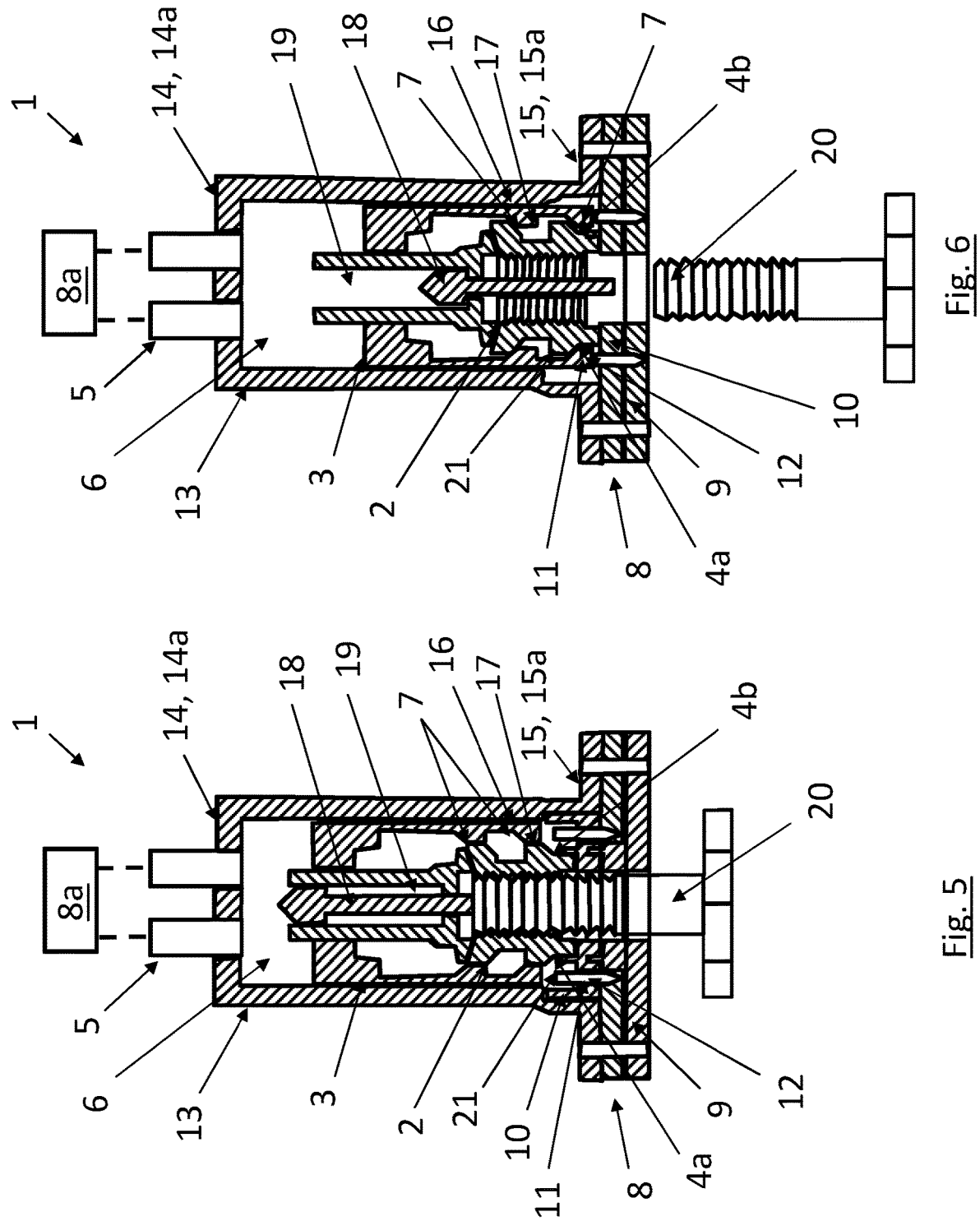

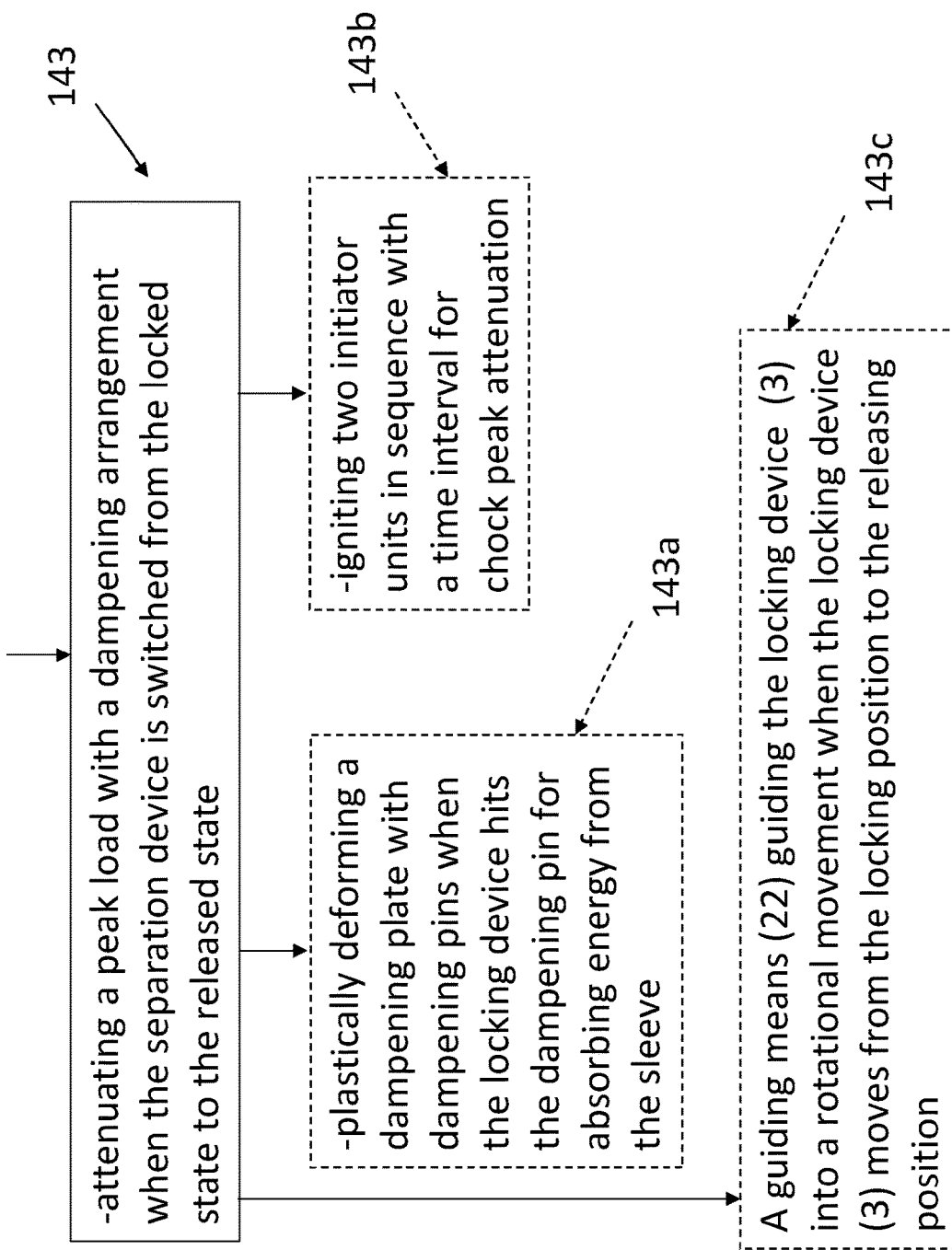

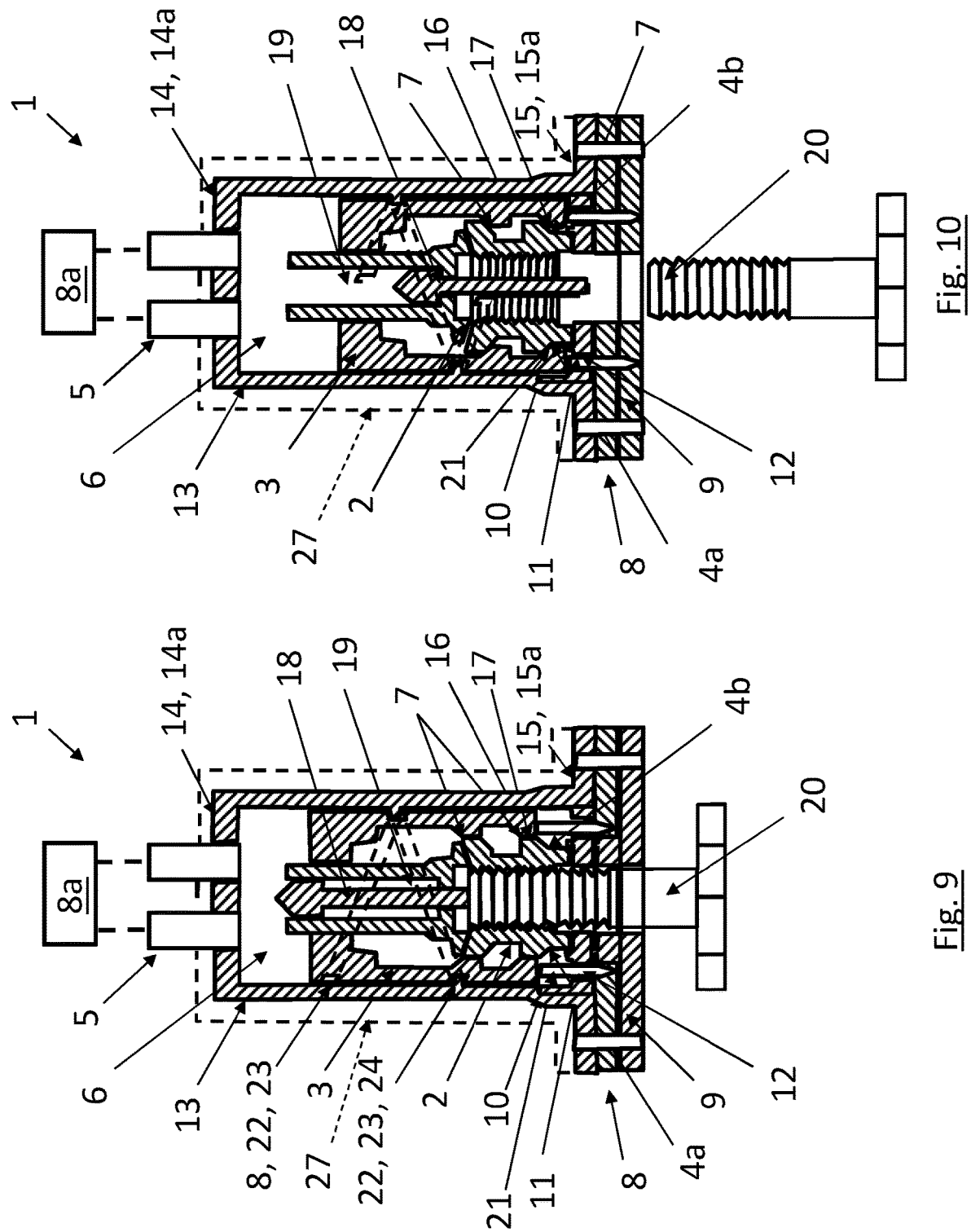

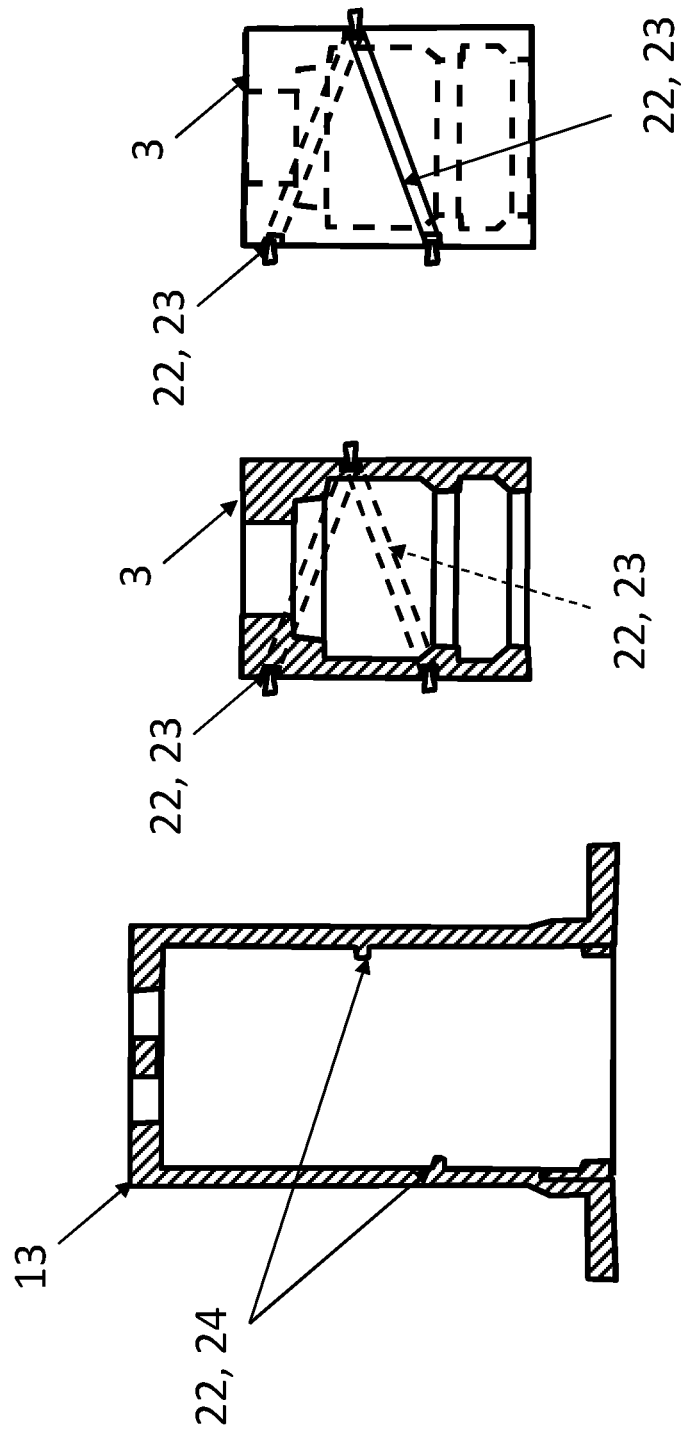

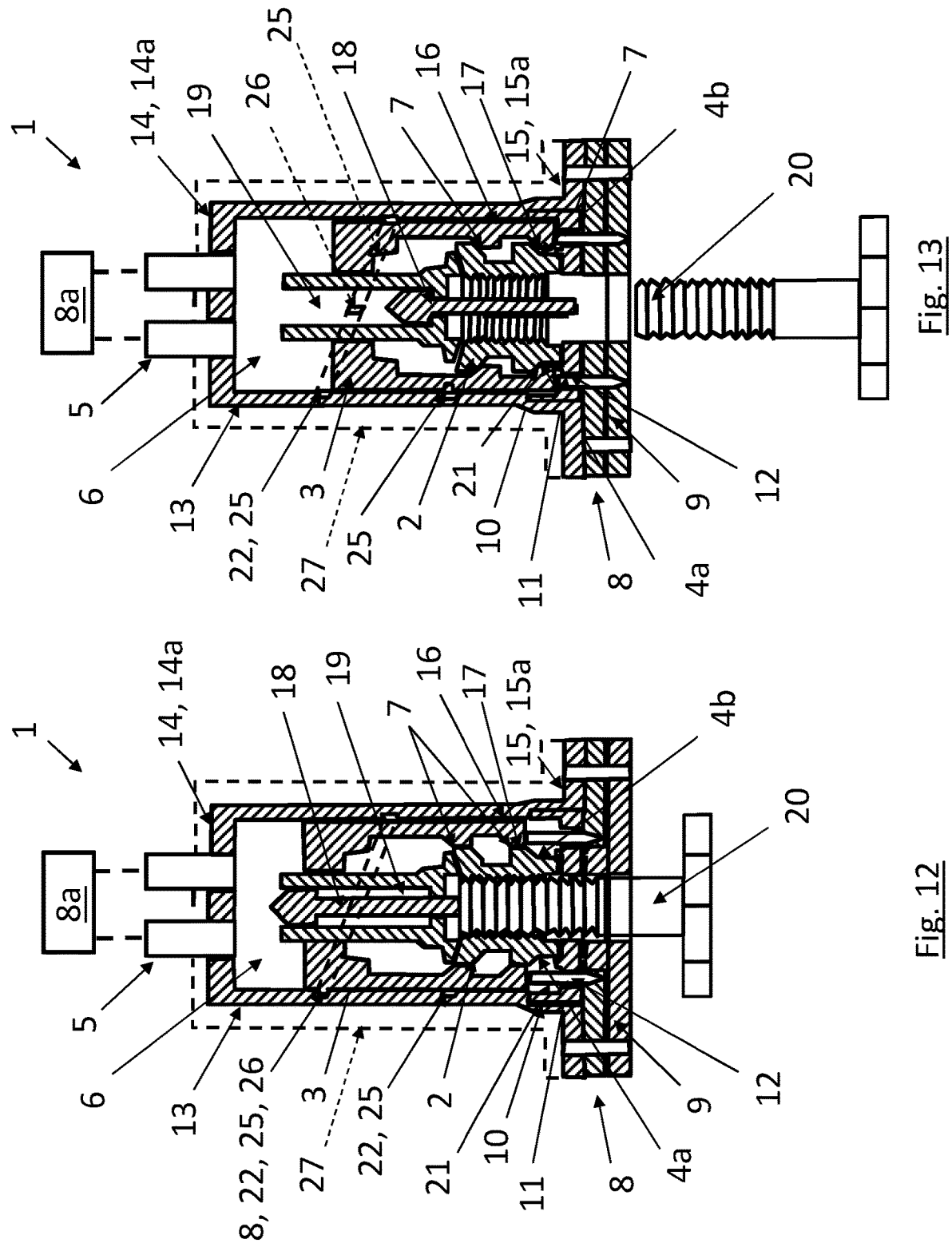

SEPARATION DEVICE FOR SPACECRAFT AND A METHOD FOR SEPARATION

CROSS-REFERENCE TO RELATED APPLICATIONS

This application is a 35 U.S.C § 371 national stage application for International Application No. PCT/SE2018/050124, filed on Feb. 9, 2018, entitled "SEPARATION DEVICE FOR SPACECRAFT AND A METHOD FOR SEPARATION", which claims priority to PCT/SE2017/050874, filed on Sep. 1, 2017, entitled "SEPARATION DEVICE FOR SPACECRAFT AND A METHOD FOR SEPARATION", the disclosures and contents of which are hereby incorporated by reference in their entireties.

TECHNICAL FIELD

The present disclosure relates to a separation device for a payload in a launcher or spacecraft. The separation device comprises an inner housing and a locking device arranged to be switched between a locking position and a releasing position. The inner housing is divided into at least two portions locked to each other by the locking device in the locking position. The separation device comprises an initiator comprising means for providing high pressure fluid to an expansion chamber when the separation device is switched from a locked state to a released state. The high pressure fluid in the expansion chamber moves the locking device from the locking position to the releasing position when the separation device is switched from the locked state to the released state.

BACKGROUND

Separation devices generate relatively high levels of shock when activated. This shock comes from different internal sources (depending on device design) such as initiator activation and bolt strain energy release. The main contributor is however the internal locking device impact when the locking device moves from the locking position to the releasing position. A payload such as a satellite is mounted onto a dispenser body which is launched by a launcher spacecraft into space. The payload is mounted to the dispenser body by separation devices arranged to release the payload at a certain position in space. It is crucial that the separation devices are separated exactly when intended to, since there will be no second chance in space to make a faulty separation successful. In order to safeguard release the separation devices are equipped with forceful initiators. Furthermore, all parts of the spacecraft, e.g. the payload and the dispenser, are designed to have as low weight as possible. The material is therefore carefully chosen to allow as thin and lightweight constructions as possible balancing on the edge of construction safety margins.

The shock generated by the separation device is problematic for the spacecraft/payload/dispenser body due to the thin construction safety margins. This problem is usually greater for smaller spacecraft due to more restricted packing volume and shorter distance between shock source and equipment.

There is thus a need for an improved separation device.

SUMMARY

An object of the present disclosure is to provide a separation device for a payload in a spacecraft or launcher and a method according to the appended claims where the previously mentioned problems are avoided. This object is at least partly achieved by the features of the independent claims. The dependent claims contain further developments of the separation device.

The separation device comprises a separation device for a spacecraft or launcher. The separation device comprises an inner housing divided into at least two portions locked to each other by a locking device in a locking position. The locking device is arranged to move between a locking position and a releasing position. The separation device comprises an initiator comprising means for providing high pressure fluid to an expansion chamber when the separation device is switched from a locked state to a released state. The high pressure fluid in the expansion chamber moves the locking device from the locking position to the releasing position when the separation device is switched from the locked state to the released state. The separation device comprises a dampening arrangement arranged to attenuate a peak load when the separation device is switched from the locked state to the released state.

In the locking position, the locking device is engaging the inner housing by locking means and thereby hindering the at least two portions from separating. In the releasing position the locking device has been moved into a position where the locking means are disengaged and the at least two portions can separate.

Here, "attenuate a peak load" or "shock peak attenuation" refers to a process of lowering an energy peak being an effect of switching the separation device from a locked state to a released state. Such transformation involves releasing a relatively large amount of energy at a short time interval in order to knock out a fastening device, such as a bolt, from a holding position. The energy must be high enough to secure separation, but would an energy peak be too high with relation to adjoining sensitive structures then the shock wave from the separation device could be harmful for the adjoining sensitive structures. The invention removes the problem with such energy peaks by use of two techniques that can be used separately or simultaneously.

According to one example, the dampening arrangement comprises a guiding means arranged to guide the locking device into a rotational movement when the locking device moves from the locking position to the releasing position. The rotational movement absorbs energy in the locking device and therefore attenuates the peak load. The energy is absorbed due to friction between parts involved in the guiding means and parts of the separation device that are in contact with each other, for example between the moving locking device the inner housing and outer housing if applicable or anything between the locking device and the inner housing and/or the outer housing. Another positive effect of the rotational movement is that a part of the energy from an initiator, being directed in a direction towards a bolt at an opposite side, is translated from an essentially linear force to a rotational force, According to one example, the guiding means form part of the locking device and the guiding means comprises a spirally formed recess and a corresponding pin.

According to one example, the spirally formed recess is arranged in the locking device and arranged to cooperate with a protrusion arranged in a surrounding housing. The surrounding housing is the outer housing or an intermediate housing between the outer housing and the locking device.

According to one example, the spirally formed recess is arranged in the surrounding housing arranged to cooperate with a protrusion arranged in the locking device. The surrounding housing is the outer housing or an intermediate housing between the outer housing and the locking device.

It should be noted that the protrusions could be in the form of one or more pin like protrusions, i.e. there could be one or a plurality of pin like protrusions. The protrusion could also be in the form of a spiral shaped protrusion that follows the shape of the spiral shaped recess. The spirally formed protrusion could be in the form of one or many spiral shaped protrusions. The length of a spiral shaped protrusion could vary from a pin like shape to a length that correspond to the spiral shaped recess. Furthermore, the spiral shaped recess may vary in length dependent in the angle of inclination of the spiral. The shortest distance is however such that the locking device can move from the locked position to the releasing position.

Here, spirally formed and spiral shaped refers to a pattern along an envelope surface. The envelope surface can be an outer envelope surface of the locking device or an inner surface of the surrounding housing. The envelope surface can be circular, oval, or comprising a number of sides i.e. a polygon.

According to one example, the dampening arrangement comprises a dampening plate in an end position in connection to the releasing position and dampening pins arranged to penetrate the dampening plate. Here, "in connection" refers to that the dampening plate is arranged either such that it actually defines the end position, i.e. the position where the locking means hits a structure that stops further motion of the locking means. It could also mean that the dampening plate is part of a structure that defines the end position, but where the dampening plate is arranged such that direct contact with the locking means is avoided. Here, a different portion of the structure could be in direct contact with the locking device. It could also be that the dampening pin(s) is arranged to stop the locking device at a distance from the dampening plate due to the retardation of speed of the locking device by the pin and dampening plate. The dampening pin is arranged to hit and plastically deform the dampening plate during movement of the locking device from the locking position to the releasing position for absorbing energy from the locking device which attenuates the peak load.

According to one example, the dampening pin comprises a pointy end with an angle that allows for the material in the dampening plate to be pressed at an angle to the travelling direction of the dampening pin. The pin(s) advantageously comprises a pointy end that penetrates the dampening plate and presses the material in the dampening plate in a direction at an angle to a traveling direction of the pin. The angle of the pointy end decides how the pin(s) affects the dampening plate in a known manner with relation to force components. The choice of material in the dampening plate together with the angle of the pointy end are design parameters that is optimized dependent on desired outcome and will not be described further.

According to one example, the dampening plate comprises a guiding plate arranged to hold and guide the dampening pin. The locking device is then arranged to hit the dampening pin during movement of the locking device from the locking position to the releasing position.

According to one example, the dampening pin is arranged in connection to the locking device. The dampening pin hits the dampening plate during movement of the locking device from the locking position to the releasing position. The dampening pin(s) can be attached directly to the locking device or indirectly via an intermediate device connected to the locking device. Here, the dampening pin(s) travel with the locking device towards the dampening plate. In another example, the dampening pin(s) is not connected to the locking device nor to the dampening plate when the separation device is in the locking position. When the locking device is pushed from the locking position to the releasing position by the means of the high pressure fluid, then the locking device hits the dampening pin(s) and brings them along to hit the dampening plate.

According to one example, the locking device is in the form of a sleeve slidably arranged between the locking position and the releasing position. The following examples are made with a sleeve, but a different locking device with a similar function could be used. The high pressure fluid in the expansion chamber moves the sleeve from the locking position to the releasing position when the separation device is switched from the locked state to the released state. In the locking position, the sleeve is engaging the inner housing by locking means hindering the at least two portions from separating. In the releasing position the sleeve is moved into a position where the locking means are disengaged and the at least two portions can separate.

According to one example, the guiding plate comprises at least one dampening pin arranged in an opening in the guiding plate. The sleeve is arranged to hit the dampening pin during movement of the sleeve when the separation device is switched from the locked state to the released state and the dampening pin is arranged to plastically deform the dampening plate when the sleeve hits the dampening pin for absorbing energy from the sleeve. When the sleeve hits the dampening pin the dampening pin moves into the dampening plate that takes up energy from the dampening pin and thus the sleeve, and therefore attenuates the shock peak that otherwise would have been the result of the sleeve hitting a non-resilient part of the separation device.

According to one example, the separation device comprises an outer housing having an extension in a longitudinal direction and comprising the first end plate covering a first end of the outer housing and the second end plate covering a second end of the outer housing positioned opposite the first end, wherein the inner housing is positioned within the outer housing and connected to the second end plate.

According to one example, the sleeve is slidably arranged between the locking position and the releasing position within the outer housing and about the inner housing.

According to one example, the expansion chamber is positioned between the first end plate and the sleeve.

According to one example, the separation device comprises an ejector slidably arranged between a locking position and a releasing position in a channel within the inner housing, wherein the expansion chamber arranged to be in fluid communication with the channel. The ejector is arranged to move from the locking position to the releasing position in the same direction as the sleeve when the separation device is switched from the locked state to the released state. When the separation device is used for securing a device, for example the payload, to another object, for example the dispenser body, then a fastening means, for example a bolt, is arranged within the inner housing. The inner housing could be arranged with threads that the fastening means are threaded into. The fastening means then also has corresponding outer threads. When the separation device is switched from the locked state to the released state, the sleeve moves from the locking position to the releasing position allowing for the at least two portions to separate. The ejector is arranged to hit the fastening means when the at least two portions are separated in order to secure the separation of the fastening means from the rest of the device.

According to one example, the high pressure fluid in the expansion chamber moves the sleeve and the ejector from the locking position to the releasing position in a direction from the first end portion towards the second end portion in the longitudinal direction.

According to one example, the second end plate comprises dampening plate, and if applicable also the guiding plate. According to one example the dampening pin is arranged to protrude into a space between the second end plate and the sleeve.

According to one example the initiator comprises at least two initiator units. The benefit of having at least two initiator units is that should one initiator unit fail, another initiator unit will ignite and secure the release operation. According to one example, the initiator units are arranged to ignite simultaneously. This has the above advantage, but since each initiator unit must have enough power to secure the release operation the peak force of the sleeve increase compared to using only one initiator. Hence, when using multiple initiators it is of the utmost importance that the dampening plate takes up energy from the dampening pin and the sleeve in order to attenuate the shock peak.

According to one example, the initiator units are ignited in sequence with a time interval for additional shock peak attenuation. This arrangement has the advantage of a secure release operation with at least one backup initiator unit. The arrangement has the further advantage of shock peak attenuation due to the ignition delay. The ignition delay, i.e. the predetermined time interval, gives that the shock peak from one initiator unit becomes offset the shock peak from another initiator unit. Together with the dampening pin and the dampening plate, the sequenced ignition gives an increased shock peak attenuation compared to any of the dampening pin/unit and sequenced ignition taken separately. Both of them taken separately gives the benefit of securing release and at the same time allowing for an even more lightweight and slim construction. However, the combination of the dampening pin/dampening plate and the sequenced ignition gives the possibility to design the dampening pin/dampening plate to a more light weight construction than should it be used by itself.

According to one example, the dampening arrangement comprises a control unit arranged to initiate the initiator units in the above described sequence.

According to one example, the separation device comprises a plurality of dampening pins. When the separation comprises a guiding plate corresponding number of openings are arranged in the guiding plate. The plurality of dampening pins is advantageously arranged symmetrically about the inner housing in order to hinder a non-uniform motion of the sleeve when going from the locking position to the releasing position.

As mentioned above, the sleeve comprises locking means and according to one example, the locking means are arranged to engage an inner portion of the outer housing and an outer portion of the inner housing thereby locking the inner housing and hindering separation of the inner housing.

The invention also relates to a method using the devices described above with the steps of:
initiating an initiator comprising means for providing high pressure fluid to an expansion chamber when the separation device is switched from a locked state to the released state, moving the sleeve from a locking position to a releasing position when the separation device is switched from a locked state to a released state by the high pressure fluid in the expansion chamber,
attenuating a peak load with a dampening arrangement when the separation device is switched from the locked state to the released state As described above, a number of examples of dampening arrangements are possible and corresponding method steps for attenuating the peak load. The method relates to using the devices with the steps of:
plastically deforming a dampening plate with dampening pin(s) when the dampening pin penetrates the dampening plate for absorbing energy from the movement of the locking device,
and/or wherein;
the initiator comprises at least two initiator units, and the initiators are ignited in sequence with a time interval, and/or wherein;
the dampening arrangement comprises a guiding means and the method comprises the step of the guiding means guiding the locking device into a rotational movement when the locking device moves from the locking position to the releasing position. Further details of the guiding means have been disclosed above and will be disclosed further in connection to the drawings.

It should be noted that using a dampening plate can be done using one initiator or two or more initiators arranged to ignite simultaneously or with a time interval. The locking device can be arranged to hit the pin(s) such that the pin is driven into the dampening plate. As an alternative, the pin(s) can be arranged in connection to the locking device such that the pin(s) travel together with the locking device towards the dampening plate before hitting the dampening plate.

According to one example each initiator is a pyrotechnic unit. Here, the means for providing high pressure fluid to the expansion chamber is combustion gas.

BRIEF DESCRIPTION OF DRAWINGS

The disclosure will be described in greater detail in the following, with reference to the attached drawings, in which;
FIG. 1 schematically shows a cross-section of a separation device according to the disclosure in a locking position,
FIG. 2 schematically shows a cross-section of the separation device in FIG. 1 but in a releasing position,
FIG. 3 schematically shows a cross-section of a separation device according to the disclosure in a locking position,
FIG. 4 schematically shows a cross-section of the separation device in FIG. 3 but in a releasing position,
FIG. 5 schematically shows a cross-section of a separation device according to the disclosure in a locking position,
FIG. 6 schematically shows a cross-section of the separation device in FIG. 5 but in a releasing position,
FIG. 7 schematically shows a flow chart of a method according to the specification,
FIG. 8 schematically shows a detailed flow chart of the method in FIG. 7,
FIG. 9 schematically shows a cross-section of a separation device according to the disclosure in a locking position,
FIG. 10 schematically shows a cross-section of the separation device in FIG. 9 but in a releasing position,
FIG. 11a schematically shows a cross-section of the outer housing in FIGS. 9 and 10,
FIG. 11b schematically shows a cross-section of the locking device in FIGS. 9 and 10, FIG. 11c schematically shows a side view of the locking device in FIGS. 9, 10 and 11b, FIG. 12 schematically shows a cross-section of a separation device according to the disclosure in a locking position, FIG. 13 schematically shows a cross-section of the separation device in FIG. 12 but in a releasing position FIG. 14a schematically shows a cross-section of the outer housing in FIGS. 12 and 13, and wherein;

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
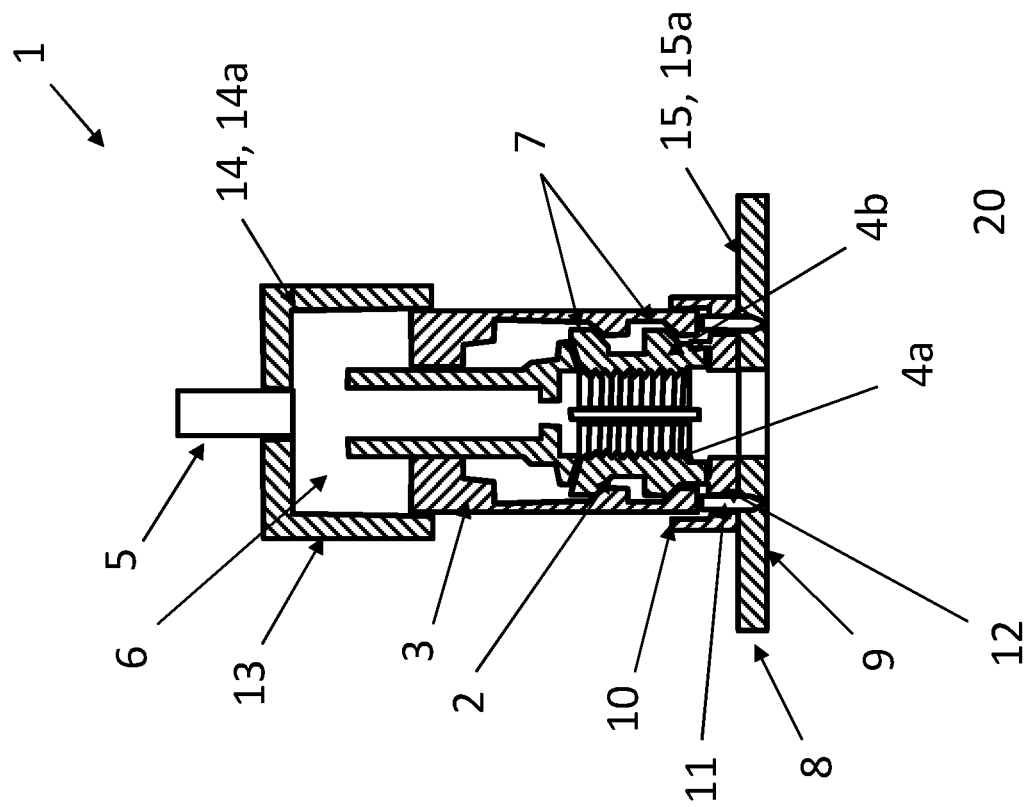

FIG. 1 schematically shows a cross-section of a separation device 1 according to the disclosure in a locking position. FIG. 1 shows that the separation device 1 comprises an inner housing 2 and a locking device 3 in the form of a sleeve 3 slidably arranged between a locking position and a releasing position. The inner housing 2 is divided into at least two portions 4a, 4b locked to each other by the sleeve 3 in the locking position. The separation device 1 comprises an initiator 5 comprising means for providing high pressure fluid to an expansion chamber 6 when the separation device 1 is switched from a locked state to a released state. The high pressure fluid in the expansion chamber 6 moves the sleeve 3 from the locking position to the releasing position when the separation device 1 is switched from the locked state to the released state. In the locking position, the sleeve 3 is engaging the inner housing 2 by locking means 7 hindering the at least two portions 4a, 4b from separating. In the releasing position the sleeve 3 is moved into a position where the locking means 7 are disengaged and the at least two portions 4a, 4b can separate.

In a spacecraft or a launcher a payload (not shown) is mounted to a dispenser body (not shown) forming a dispenser assembly. The payload is mounted and secured to the dispenser body by the separation devices 1 arranged to release the payload at a certain position in space. In order to solve the problem of shock peaks in the payload assembly, the separation device 1 comprises a dampening arrangement 8. In FIGS. 1-6 the dampening arrangement 8 comprises a dampening plate 9 with or without a guiding plate 10 for one or more dampening pins 11. In FIGS. 5 and 6 the dampening arrangement 8 comprises two initiator units 5 being arranged to ignite according to a time sequence. In FIGS. 5 and 6 the dampening arrangement 8 comprises a control unit 8a arranged to initiate the initiator units 5 in the time sequence. The control unit 8a can be any suitable device that can perform the task of initiating the initiator units. It should be noted that depending on the chosen embodiment of the invention a similar control unit (not shown) can be used also for controlling a single initiator according to FIGS. 1-4, or to simultaneously initiate two or more initiators.

Should the dampening comprise a guiding plate 10, then the dampening pin 11 could be arranged in corresponding openings 12 in the guiding plate 10.

Figure 2:
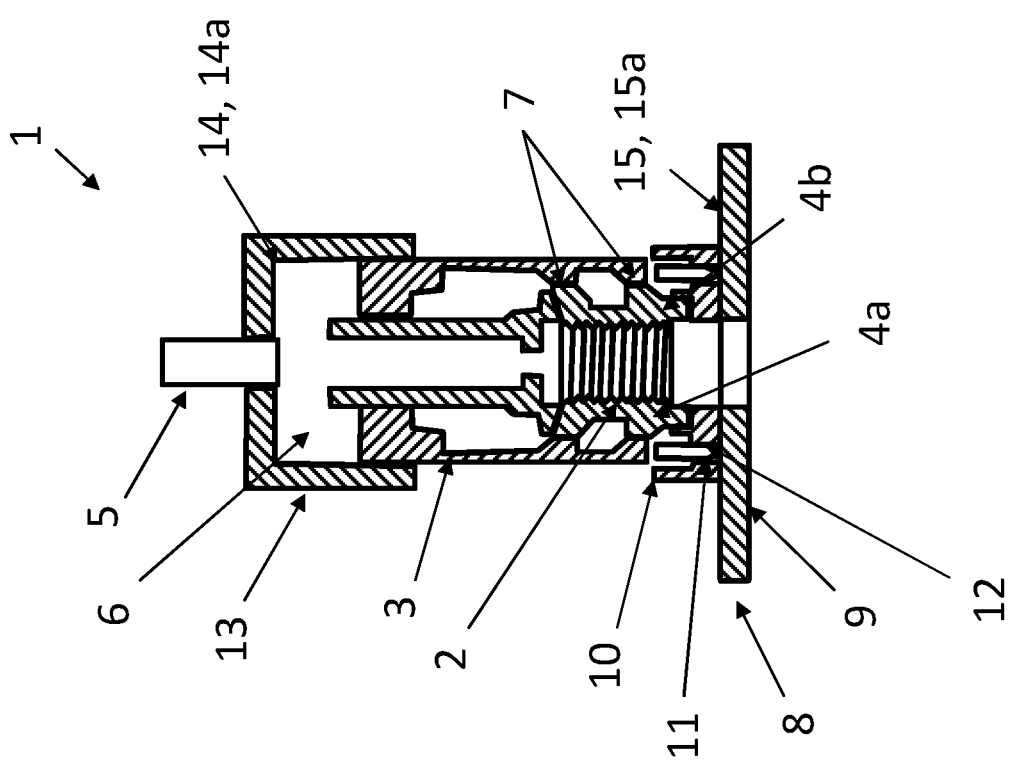

FIG. 2 shows the same as in FIG. 1, but where the separation device 1 is in a released state. FIG. 2 shows that the sleeve 3 is arranged to hit the dampening pin 11 during movement of the sleeve 3 when the separation device 1 is switched from the locked state as shown in FIG. 1 to the released state as shown in FIG. 2 and the dampening pin 11 is arranged to plastically deform the dampening plate 9 when the sleeve 3 hits the dampening pin 11 for absorbing energy from the sleeve 3. When the sleeve 3 hits the dampening pin 11 the dampening pin 11 moves into the dampening plate 9 that takes up energy from the dampening pin 11 and thus the sleeve 3, and therefore attenuates the shock peak that otherwise would have been the result of the sleeve 3 hitting a less resilient part of the separation device 1.

Figure 3:
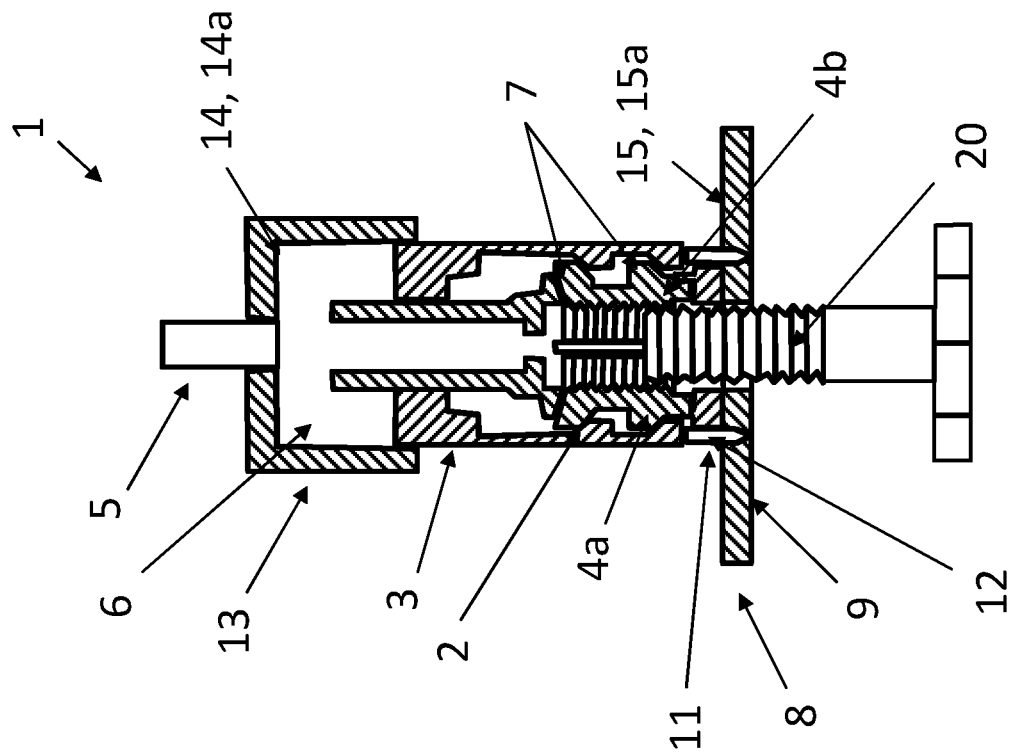

FIG. 3 shows the same separation device 1 as FIG. 1 and corresponding description, but with the difference that the separation device 1 lacks a guiding plate 10 as in FIG. 1 and that a fastening means 20 in the form of a bolt is arranged in the separation device 1.

Figure 4:
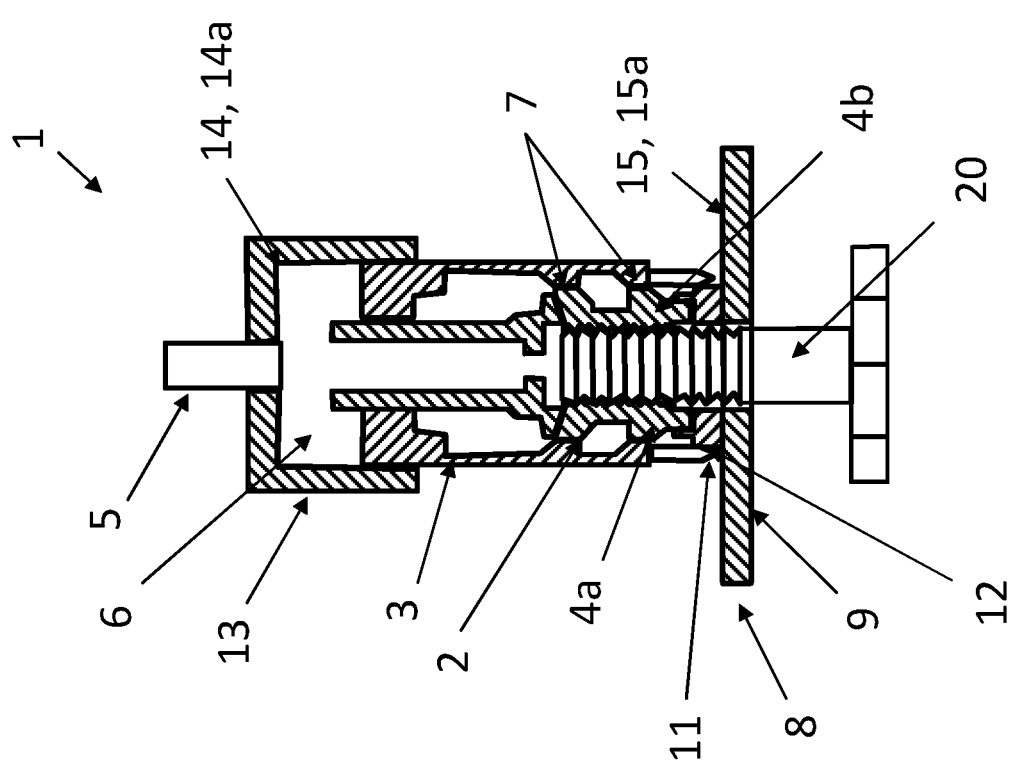

FIG. 4 shows the same separation device 1 as FIG. 2 and corresponding description, but with the difference that the separation device 1 lacks a guiding plate 10 as in FIG. 3 and that a fastening means 20 in the form of a bolt is arranged in the separation device 1.

The fastening means 20 may also be part of the separation device 1 in FIGS. 1 and 2, but has been removed in FIGS. 1 and 2 in order to facilitate the description of the inner housing 2.

It should be noted that in FIGS. 1-4 the separation device 1 has been described in a rudimentary way to simplify explanation of the invention without revealing too much details at the same time. For example, the outer housing and the dampening pins 11 in FIGS. 3 and 4 seem to hang in the air. However, the outer housing could be arranged as depicted in FIGS. 5 and 6 or in a similar way where an outer housing 13 and a second end plate 14 builds a unit. The dampening pins 11 can be attached directly or indirectly to the locking device 3 or can be arranged in a guiding arrangement such as a guiding plate 10 in FIGS. 1, 2, 5 and 6.

FIG. 5 shows one example where the separation device 1 is in a locked state and wherein the separation device 1 comprises an outer housing 13 having an extension in a longitudinal direction and comprising a first end plate 14 covering a first end 14a of the outer housing 13 and a second end plate 15 covering a second end 15a of the outer housing 13 positioned opposite the first end, wherein the inner housing 2 is positioned within the outer housing 13 and connected to the second end plate 15. In FIG. 3, the dampening plate 9 is connected to or part of the second end plate 15. In FIG. 5, the initiator 5 comprises two initiator units 5, but the separation devices 1 according to FIGS. 1-4 could be equipped with more than one initiator units.

FIG. 6 shows the same as in FIG. 5, but where the separation device 1 is in a released state.

The following is with reference to FIGS. 1-6:

According to one example, the sleeve 3 is slidably arranged between the locking position and the releasing position within the outer housing 13 and about the inner housing 2. Here, the sleeve is a ring shaped unit comprising locking means 7 arranged to engage an inner portion 16 of the outer housing 13 and an outer portion 17 of the inner housing 2 thereby locking the inner housing 2 and hindering separation of the inner housing 2.

In the figures, the expansion chamber 6 is positioned between the first end plate 14 and the sleeve 2.

According to one example shown in FIGS. 5 and 6, the separation device 1 comprises an ejector 18 slidably arranged between a locking position and a releasing position in a channel 19 within the inner housing 2. The expansion chamber 6 is arranged to be in fluid communication with the channel 19. The ejector 18 is arranged to move from the locking position to the releasing position in the same direction as the sleeve 3 when the separation device 1 is switched from the locked state to the released state. When the separation device 1 is used for securing a device, for example the payload, to another object, for example the dispenser body, then a fastening means 20, for example a bolt, is arranged within the inner housing 2. The inner housing 2 could be arranged with threads that the fastening means 20 are threaded into. The fastening means 20 then also has corresponding outer threads. When the separation device 1 is switched from the locked state to the released state, the sleeve 3 moves from the locking position to the releasing position allowing for the at least two portions 4a, 4b to separate. The ejector 18 is arranged to hit the fastening means 20 when the at least two portions 4a, 4b are separated in order to secure the separation of the fastening means 20 from the rest of the separation device 1.

According to one example, the high pressure fluid in the expansion chamber 6 moves the sleeve 3 from the locking position to the releasing position in a direction from the first end portion 14a towards the second end portion 15a in the longitudinal direction.

According to one example, the second end plate 15 comprises the guiding plate 10 and the dampening plate 9, wherein the dampening pin 11 is arranged to protrude into a space 21 between the second end plate 15 and the sleeve 3 when the separation device 1 is in the locked state.

According to FIGS. 5 and 6 the initiator 5 comprises at least two initiator units 5. The benefit of having at least two initiator units 5 is that should one initiator unit 5 fail, another initiator unit 5 will ignite and secure the release operation. According to one example, the initiator units 5 are arranged to ignite simultaneously and this has the above advantage, but since each initiator unit 5 must have enough power to secure the release operation the peak force of the sleeve 3 increase compared to using only one initiator 5. Hence, when using multiple initiators it is of the utmost importance that the dampening plate 9 takes up energy from the dampening pin 11 and the sleeve in order to attenuate the shock peak.

According to one example, the initiator units 5 are ignited in sequence with a predetermined time interval for additional shock peak attenuation. This arrangement has the advantage of a secure release operation with at least one backup initiator unit. The arrangement has the further advantage of shock peak attenuation due to the ignition delay. The ignition delay, i.e. the predetermined time interval, gives that the shock peak from one initiator unit 5 becomes offset the shock peak from another initiator unit 5. Together with the dampening pin 11 and the dampening plate, the sequenced ignition gives an increased shock peak attenuation compared to any of the dampening pin 11 and sequenced ignition taken separately. Both of them taken separately gives the benefit of securing release and at the same time allowing for an even more lightweight and slim construction. However, the combination of the dampening plate 9 and the sequenced ignition gives the possibility to design the dampening arrangement 8 to a more light weight construction than should it be used by itself.

According to one example, the separation device 1 comprises a plurality of dampening pins 11 and a corresponding number of openings 12 in the guiding plate 10. In FIGS. 1-6 it is depicted two dampening pins 11 and corresponding number of openings in the guiding plate 10. The plurality of dampening pins 11 is advantageously arranged symmetrically about the inner housing in order to hinder a non-uniform motion of the sleeve when going from the locking position to the releasing position.

Figure 7:
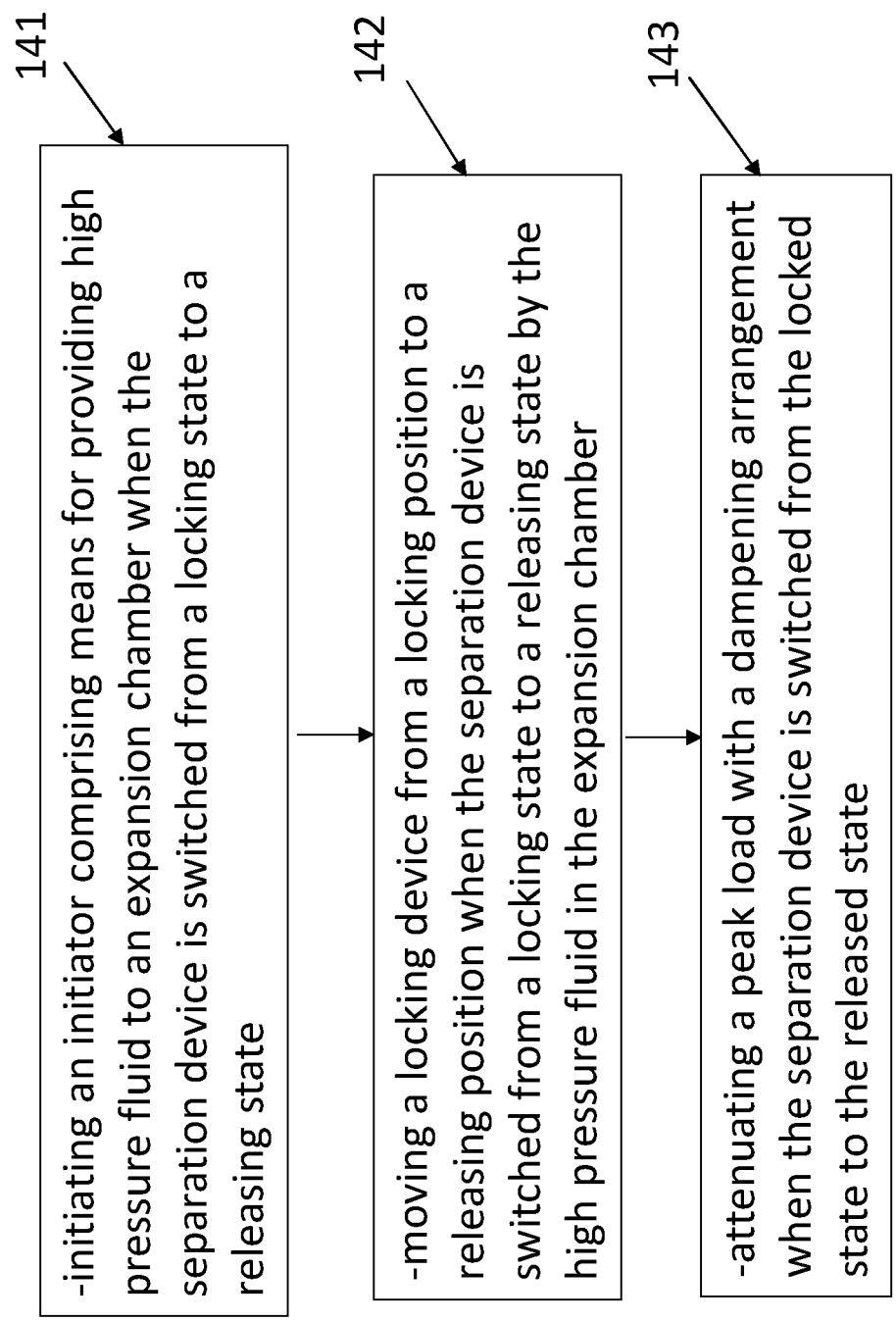

FIG. 7 schematically shows a flow chart of a method according to the specification. The method relates to using the devices in FIGS. 1-6 with the steps of:

Box 141:

initiating an initiator 5 comprising means for providing high pressure fluid to an expansion chamber 6 when the separation device 1 is switched from a locked state to a released state, Box 142 moving the sleeve from a locking position to a releasing position when the separation device 1 is switched from a locked state to a released state by the high pressure fluid in the expansion chamber 6, Box 143 attenuating a peak load with a dampening arrangement 8 when the separation device 1 is switched from the locked state to the released state FIG. 8 schematically shows a flow chart of three examples of dampening arrangements according to the specification and corresponding method steps for attenuating the peak load. The method relates to using the devices in FIGS. 1-6 and FIGS. 9-14 with the steps of:

Box 143a plastically deforming a dampening plate 9 with dampening pin(s) 11 when the dampening pin 11 penetrates the dampening plate 9 for absorbing energy from the movement of the locking device 3.

Box 143b the initiator 5 comprises at least two initiator units, and the initiators are ignited in sequence with a time interval for shock peak attenuation.

Box 143c the dampening arrangement 8 comprises a guiding means 22 and the method comprises the step of the guiding means 22 guiding the locking device 3 into a rotational movement when the locking device 3 moves from the locking position to the releasing position It should be noted that the step in Box 143a can be done using one initiator or two or more initiators arranged to ignite simultaneously or with a time interval according to Box 143b. In Box 143a the locking device 3 can be arranged to hit the pin(s) such that the pin is driven into the dampening plate 9. As an alternative, the pin(s) can be arranged in connection to the locking device 3 such that the pin(s) travel together with the locking device 3 towards the dampening plate 9 before hitting the dampening plate 9.

The pin(s) advantageously comprises a pointy end that penetrates the dampening plate 9 and presses the material in the dampening plate 9 in a direction at an angle to a traveling direction if the pin(s). The angle of the pointy end decides how the pin(s) affects the dampening plate 9 in a known manner with relation to force components. The choice of material in the dampening plate 9 together with the angle of the pointy end are design parameters that is optimized dependent on desired outcome and will not be described further.

According to one example each initiator 5 is a pyrotechnic unit that generates a high pressure fluid in the form of hot combustion gas.

The separation device 1 described in connection to FIGS. 9-14 comprises the same features as described in FIGS. 5 and 6, with a dampening arrangement 8 including both a dampening plate 9 and two initiators 5 with corresponding features such as dampening pins 11 and sequential ignition.

However, it should be noted that the features in FIGS. 9-14 are combined with the features in any of the FIGS. 1-8 without one or both of the dampening plate 9 and two initiators 5.

FIG. 9 schematically shows a cross-section of a separation device according to the disclosure in a locking position. FIG. 1 shows that the dampening arrangement 8 comprises a guiding means 22 arranged to guide the locking device 3 into a rotational movement when the locking device 3 moves from the locking position to the releasing position. As mentioned above, the guiding means 22 could be taken alone, or in combination with either of or both of the dampening plate 9 and two initiators 5.

In FIGS. 9-14, the guiding means 22 is a part of the locking device 3.

FIGS. 9, 10 and 11a-11c show that the guiding means 22 is a spirally formed recess 23 in the locking device 3 arranged to cooperate with a protrusion 24 arranged in a surrounding housing. FIGS. 9-11 show that the guiding means 22 comprises two protrusions 24, but as mentioned before the guiding means 22 could comprise one or a plurality of protrusions in different form and shape.

FIG. 10 schematically shows a cross-section of the separation device in FIG. 9 but in a releasing position, FIG. 11a schematically shows a cross-section of the outer housing in FIGS. 9 and 10.

FIG. 11b schematically shows a cross-section of the locking device in FIGS. 9 and 10, FIG. 11c schematically shows a side view of the locking device in FIGS. 9, 10 and 11b, FIG. 12 schematically shows a cross-section of a separation device according to the disclosure in a locking position. FIGS. 12-14 show that the guiding means 22 comprises a spirally formed recess 25 in the surrounding housing 13 arranged to cooperate with a protrusion 26 arranged in the locking device 3. FIGS. 12-14 show that the guiding means 22 comprises one protrusion 26, but as mentioned before the guiding means 22 could comprise one or a plurality of protrusions in different form and shape.

FIG. 13 schematically shows a cross-section of the separation device in FIG. 12 but in a releasing position.

Figure 14B:
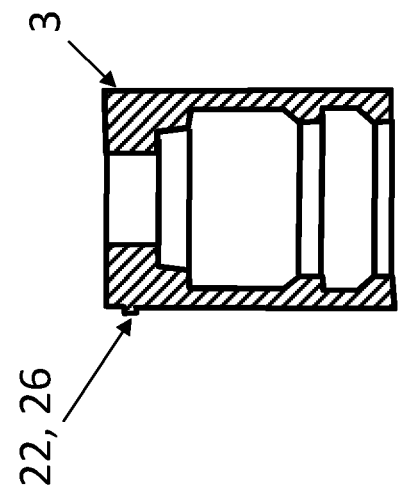
FIG. 14b schematically shows a cross-section of the locking device in FIGS. 12 and 13.
Figure 14A:
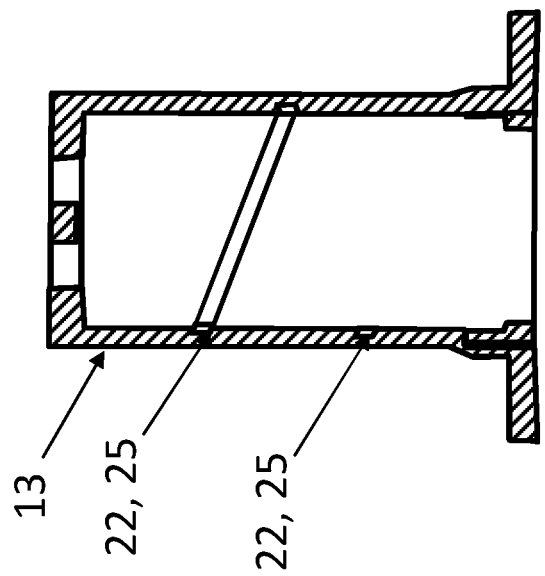

FIG. 14a schematically shows a cross-section of the outer housing in FIGS. 12 and 13.

FIG. 14b schematically shows a cross-section of the locking device in FIGS. 12 and 13.

According to FIGS. 9-14, the surrounding housing 13 is the outer housing 13. However, it should be noted that the surrounding housing could be an Intermediate housing between an outer housing and the locking device 3. In FIGS. 9-14, it is portrayed with a dashed line that the separation device may comprise an additional outer layer/housing 27 outside the outer housing 13 which renders the outer housing 27 an intermediate housing.

It should be noted that the protrusions 24, 26 in FIGS. 9-14 could be in the form of one or more pin like protrusions. FIGS. 9, 10 and 11a-11c depicts two pin like protrusions, but according to other examples there could be one or a plurality of pin like protrusions. The protrusion could also be in the form of a spiral shaped protrusion that follows the shape of the spiral shaped recess. The spiral shaped protrusion could be in the form of one or many spiral shaped protrusions. The length of a spiral shaped protrusion could vary from a pin like shape to a length that correspond to the spiral shaped recess. Furthermore, the spiral shaped recess may vary in length dependent in the angle of inclination of the spiral. The shortest distance is however such that the locking device 3 can move from the locked position to the releasing position.

It will be appreciated that the above description is merely exemplary in nature and is not intended to limit the present disclosure, its application or uses.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

The invention claimed is:

1. A separation device for a spacecraft or launcher, the separation device comprising:
   an inner housing divided into at least two portions locked to each other by a locking device in a locking position and thereby hindering the at least two portions from separating, the locking device is a sleeve configured to engage the inner housing by locking, wherein the locking device is arranged to move between a locking position and a releasing position; and
   an initiator comprising means for providing high pressure fluid to an expansion chamber when the separation device is switched from a locked state to a released state, wherein the high pressure fluid in the expansion chamber moves the locking device from the locking position to the releasing position when the separation device is switched from the locked state to the released state, characterized in that the separation device comprises:
   a dampening arrangement arranged to attenuate a peak load when the separation device is switched from the locked state to the released state, wherein the dampening arrangement comprises a guiding means arranged to guide the locking device into a rotational movement when the locking device moves from the locking position to the releasing position, and wherein the guiding means comprises a spirally formed recess in the locking device arranged to cooperate with a protrusion arranged in a surrounding housing or wherein the guiding means is a spirally formed recess in the surrounding housing arranged to cooperate with a protrusion arranged in the locking device.

2. The separation device according to claim 1, wherein the surrounding housing is an outer housing or an intermediate housing between the outer housing and the locking device.

3. The separation device according to claim 1, wherein the dampening arrangement comprises a dampening plate in an end position in connection to the releasing position, wherein the dampening arrangement comprises at least one dampening pin arranged between the locking device and the dampening plate, wherein the dampening pin is arranged to hit and plastically deform the dampening plate during movement of the locking device from the locking position to the releasing position for absorbing energy from the locking device which attenuates the peak load.

4. The separation device according to claim 3, wherein the dampening pin comprises a pointy end with an angle that allows for a material in the dampening plate to be pressed at an angle to a travelling direction of the dampening pin.

5. The separation device according to claim 3, wherein the dampening plate comprises a guiding plate arranged to hold and guide the dampening pin, wherein the locking device is arranged to hit the dampening pin during movement of the locking device from the locking position to the releasing position.

6. The separation device according to claim 3, wherein the dampening pin is arranged in connection to the locking device, wherein the dampening pin hits the dampening plate during movement of the locking device from the locking position to the releasing position.

7. The separation device according to claim 3, wherein the separation device comprises an outer housing having an extension in a longitudinal direction and comprising a first end plate covering a first end portion of the outer housing and a second end plate covering a second end portion of the outer housing positioned opposite the first end portion, wherein the second end plate is arranged in connection to the end position, wherein the inner housing is positioned within the outer housing and attached to the second end plate, and wherein the second end plate comprises the dampening plate.

8. The separation device according to claim 7, wherein the locking device is slidably arranged between the locking position and the releasing position within the outer housing and about the inner housing.

9. The separation device according to claim 7, wherein the expansion chamber is positioned between the first end plate and the locking device, and wherein the high pressure fluid in the expansion chamber moves the locking device from the locking position to the releasing position in a direction from the first end portion towards the second end portion in the longitudinal direction.

10. The separation device according to claim 1, wherein the locking device is a sleeve slidably arranged between the locking position and the releasing position.

11. The separation device according to claim 1, wherein the separation device comprises an ejector slidably arranged between the locking position and the releasing position in a channel within the inner housing, wherein the expansion chamber is arranged to be in fluid communication with the channel.

12. The separation device according to claim 1, wherein the locking device comprises locking means arranged to engage an inner portion of an outer housing and an outer portion of the inner housing thereby locking the inner housing and hindering separation of the inner housing.

13. The separation device according to claim 3, wherein the separation device comprises a plurality of dampening pins.

14. The separation device according to claim 1, wherein the initiator comprises at least two initiator units.

15. The separation device according to claim 14, wherein the initiator units are arranged to ignite simultaneously.

16. The separation device according to claim 14, wherein the dampening arrangement comprises a control unit arranged to initiate the initiator units in a sequence with a time interval for shock peak attenuation.

17. The separation device according to claim 1, wherein the initiator is a pyrotechnic unit.

18. A method for using a separation device, wherein the method comprises the steps of:
   initiating an initiator comprising means for providing high pressure fluid to an expansion chamber when the separation device is switched from a locked state to a released state;
   moving a locking device from a locking position to a releasing position when the separation device is switched from a locked state to a released state by the high pressure fluid in the expansion chamber; and
   attenuating a peak load with a dampening arrangement when the separation device is switched from the locked state to the released state, wherein the dampening arrangement comprises a guiding means and wherein the method comprises the step of the guiding means guiding the locking device into a rotational movement when the locking device moves from the locking position to the releasing position, and wherein the guiding means comprises a spirally formed recess in the locking device arranged to cooperate with a protrusion arranged in a surrounding housing or wherein the guiding means is a spirally formed recess in the surrounding housing arranged to cooperate with a protrusion arranged in the locking device.

19. The method according to claim 18, wherein the initiator comprises at least two initiator units, and wherein the initiator units are arranged to ignite simultaneously or wherein the initiator units are ignited in sequence with a time interval for shock peak attenuation.

* * * * *